United States Patent [19]

Nagashima

[11] 4,083,187

[45] Apr. 11, 1978

[54] ACTUATOR FOR EMERGENCY OPERATION

[75] Inventor: Tugio Nagashima, Yokosuka, Japan

[73] Assignee: Tokico Ltd., Kawasaki, Japan

[21] Appl. No.: 748,389

[22] Filed: Dec. 7, 1976

[30] Foreign Application Priority Data

Dec. 9, 1975 Japan .................................. 50-145876
Dec. 10, 1975 Japan .................................. 50-146258

[51] Int. Cl.² ......................... F15B 11/06; F15B 20/00
[52] U.S. Cl. ..................... 60/407; 137/68 R; 222/5
[58] Field of Search ................. 60/403, 407, 632, 636, 60/458, 494; 91/42, 52, 55; 137/68 R; 222/5; 92/12, 143

[56] References Cited

U.S. PATENT DOCUMENTS

| 2,653,602 | 9/1953 | Smoot | 91/52 X |
| 3,031,845 | 5/1962 | Ludwig | 60/636 X |
| 3,099,135 | 7/1963 | Hoadley | 60/494 |
| 3,540,218 | 11/1970 | Finn | 60/430 |

FOREIGN PATENT DOCUMENTS

263,482  4/1927  United Kingdom .................... 222/5

*Primary Examiner*—Edgar W. Geoghegan
*Attorney, Agent, or Firm*—Haseltine, Lake & Waters

[57] ABSTRACT

An actuator for operating a driven device in an emergency comprises: an actuator mechanism having a cylinder, a piston slidably disposed within the cylinder and coupled to the driven device, an operational chamber defined by the cylinder and piston, and a passage communicating with the operational chamber; a high pressure gas generating source comprising a container vessel having an opening, a high pressure gas generating medium contained within the vessel, and a sealing member for sealing the opening of the vessel; and unsealing means operating in response to an emergency operation signal from the outside to unseal the sealing member of the high pressure gas generating source. High pressure gas from the high pressure gas generating medium flows through the opening and passage into the operational chamber upon unsealing of the sealing member of the high pressure gas generating source and operates the piston thereby to drive the driven device.

5 Claims, 8 Drawing Figures

ACTUATOR FOR EMERGENCY OPERATION

BACKGROUND OF THE INVENTION

The present invention relates to actuators for emergency operation, and more particularly to an actuator in which a small-sized container such as a gas bottle or cylinder charged with compressed high pressure gas is detachably attached to an actuator mechanism in communication with an operation chamber thereof. The high pressure gas in the container is expelled or discharged in an emergency, and causes the actuator mechanism to be driven by the discharged high pressure gas as a working fluid.

In general, actuators driven by compressed gas as a working source have been designed heretofore so as to be driven by compressed air from a driving power source such as an air compressor installed outside thereof. This practice is accompanied by difficulties such as complicated structural organization and requirement for large installation space.

In an equipment for supplying city gas and for pipelines in petroleum chemical plants, emergency shut-off valves adapted to close when emergency situations such as earthquakes and fires occur are installed at important points of the supply pipeline. As means for driving an emergency shutoff valve of this type, an actuator has heretofore been used. In this case, however, there arise problems such as bulky equipment and the requirement that the air compressor is driven continuously even in a normal state in preparation for an emergency situation, whereby the power cost and maintenance cost amount to a large sum. Further, in the probable case where the air compressor is damaged simultaneously with the occurrence of an earthquake, the actuator is not driven at all, and the emergency shut-off valve does not operate to serve its intended purpose. As a result, there arises the serious problem of a secondary accident induced by the earthquake not being prevented from occurring.

Furthermore, installation of the emergency shut-off valve having the aforementioned actuator in existing equipment for supplying city gas entails a difficulty in that the additional equipment required is considerably complicated and expensive.

SUMMARY OF THE INVENTION

Accordingly, it is a general object of the present invention to provide a novel and useful actuator for emergency operation in which the above described difficulties have been overcome.

A specific object of the present invention is to provide an actuator for emergency operation in which, by attaching a small-sized container sealed and charged with compressed high pressure gas to an actuator mechanism in a detachable manner, the actuator mechanism is caused to be driven with high pressure gas by unsealing the container at the time of emergency. In accordance with the invention, it becomes possible to drive positively the actuator mechanism without any special additional equipment.

Another object of the invention is to provide an actuator for emergency operation which is so adapted that an unsealing member is activated by releasing the locked state of the unsealing member, which has been stored with unsealing force and thus locked beforehand, thereby to unseal the sealing member of the container. According to this invention, the force required to release the locked state is small. In the case where a plunger-solenoid mechanism is used as the lock releasing means, a commercial power supply is not required, but a battery available on the market may be employed.

Still another object of the present invention is to provide an actuator for emergency operation in which a plunger-solenoid is used to drive directly an unsealing member thereby to unseal a gas container.

A further object of the present invention is to provide an actuator for emergency operation in which a through-hole for communicating the interior and exterior of an operation chamber is formed in a piston disposed slidably within an actuator mechanism. The through-hole serves, after the actuator mechanism is operated, to drop the internal pressure of the operation chamber to atmospheric pressure.

Further objects and features of the invention will be apparent from the following detailed description when read in conjunction with the accompanying drawings.

DETAILED DESCRIPTION

Figure 1:
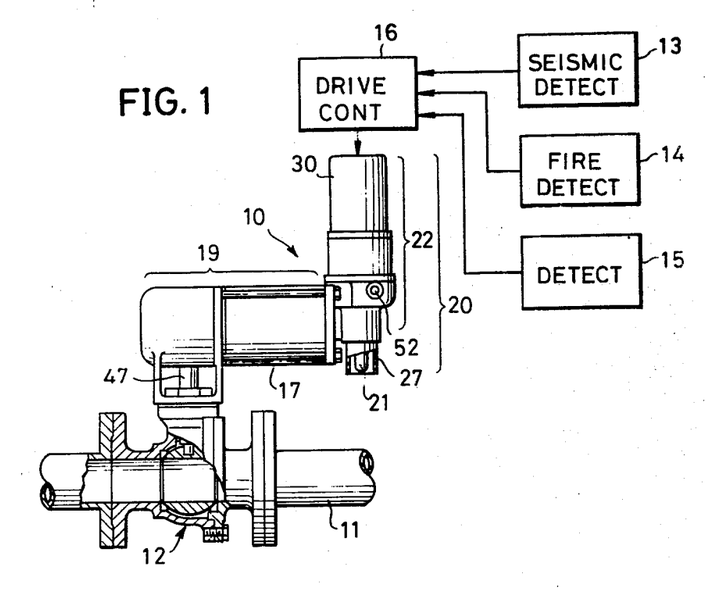
FIG. 1 is a schematic diagram showing one example of an emergency shut-off valve system to which an actuator for emergency operation according to the present invention is applied.

In FIG. 1, an actuator 10 for emergency operation is installed and arranged so as to close an emergency shut-off valve 12 at a time of emergency. The valve 12 is a ball valve or a butterfly valve, for example, and is installed at an intermediate point in a pipeline 11 for supplying a fluid such as city gas. The actuator 10 is activated by a signal from a drive controller 16 which generates the signal in response to signals from a seismic detector 13 for detecting earthquake tremors, a fire detector 14 for detecting flame and/or smoke when fire occurs, and a detector 15 for detecting abnormal processing phenomena such as abnormal change in pressure in the pipe line and then causing the valve 12 to close, thereby cutting off liquid supply through the supply pipe 11 when any of the above described emergency conditions occurs.

The actuator 10 comprises, essentially, an actuator mechanism 19 which is made up of a cylinder 17 and a piston 18 slidably fitted therein, and an actuator driving mechanism 20. The actuator driving mechanism 20 is composed of a gas cylinder 21 in which highly compressed gas is charged and an unsealing mechanism 22 for unsealing a seal of the gas cylinder 21.

Figures 2, 3:
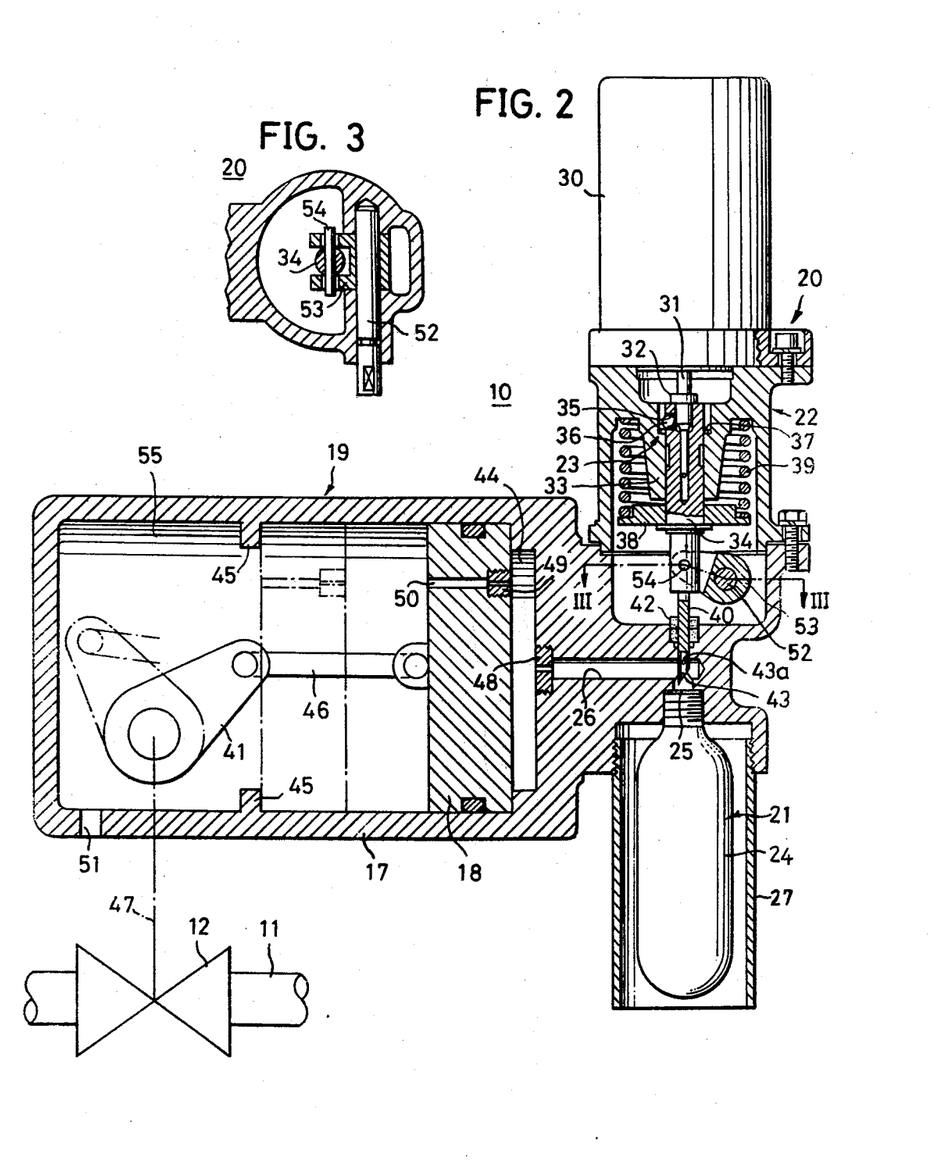
FIG. 2 is an elevation, partly in section, showing a first embodiment of an actuator for emergency operation according to the present invention adapted to the system indicated in FIG. 1.
FIG. 3 is a transverse section taken along the line III—III in FIG. 2.

The gas cylinder 21 is a hollow cylindrical structure 24 charged with either compressed air in gaseous state or a nonflammable pressurized gas generating member such as liquid nitrogen or liquid carbonic acid gas, or dry ice in solid state, and an opening of the cylinder body 24 is sealed by means of a rupture disc 25 in airtight state. The cylinder 21 is screwed and fixed in a detachable manner at a position facing a passage 26 for communicating with a cylinder chamber 44 described hereinafter and is protected by a cylinder protector 27 from the outside.

In the cylinder unsealing mechanism 22, a plunger-solenoid mechanism 30 is normally in an inoperative state, and a plunger 31 thereof is thus positioned at a lowered position. A needle 32 connected to the plunger 31 at its lower extremity is inserted into and engaged with a hollow portion of a rod 34 which is slidable along a guide 33. A ball 36 which is fitted in and engaged with a through-hole 35 formed through the side wall of the rod 34 is in contact with a side peripheral surface of a large diameter part of the needle 32 thereby projecting a part thereof outside of the outer surface of the rod 34. This outwardly projected part of this ball 36 is engaged with an annular ball-retainer 37 which is fixed to the guide 33 at the upper part thereof. Accordingly, the rod 34 is locked at an upper limit position in a state in which it is energized with a downward expansion force by a coiled spring 39 interposed between a spring retainer 38 and the ceiling of a cylindrical chamber into which the guide 33 extends downwardly.

As a result, a needle or cutter 40 connected to the lower end of the rod 34 is in a position where its sharp lower end is positioned apart from the rupture disc 25 of the cylinder 21 by a predetermined distance.

The operation of the apparatus of the above described construction will now be described with reference to FIGS. 3 and 4. In the normal state, the plunger-solenoid 30 is not supplied with electric power, and is thereby in an inoperative state. Accordingly, the rod 34 and the cutter 40 are locked at their upper positions as indicated in FIG. 2, and the high pressure gas is confined inside of the cylinder body 24. The piston 18 in the cylinder 17 is positioned at a slidable limit towards the right as viewed in the same figure and indicated by full line, and a rotatable arm 41 is in a position to which it has rotated in the clockwise direction. The emergency shut-off valve 12 is in its closed state.

Here, it will be assumed that an earthquake, a fire or some abnormal state occurs in the pipe line when the fluid such as city gas or petroleum is being continuously supplied through the pipe 11 in a normal state. In concurrence with occurrence of the above mentioned abnormal condition, the seismic detector 13, the fire detector 14, or the detector 15 operates to activate the drive controller 16, whereby the signal therefrom is supplied to the plunger-solenoid 30. Accordingly, the plunger-solenoid 30 is supplied with electric power to be energized, and the plunger 31 and the needle 32 thereby move upward.

The pushing force which the ball 36 applies to the needle 32 is a component in the horizontal direction resulting from division of the expansion force in the vertical direction of the coiled spring 39 by the surface of the ball retainer 37 and therefore is a considerably small force. For this reason, a small operating force of the plunger-solenoid 30 for displacing the plunger 31 and the needle 32 is sufficient. For this reason, the current supplied to the plunger-solenoid 30 may be of a low value, and the plunger-solenoid mechanism can be of explosion-proof construction. Accordingly, this apparatus is applicable to pipelines for conducting dangerous fluids such as city gas. Moreover, the time period for energizing the plunger-solenoid 30 may be short and be merely sufficient for positively operating the solenoid.

Figures 4, 6:
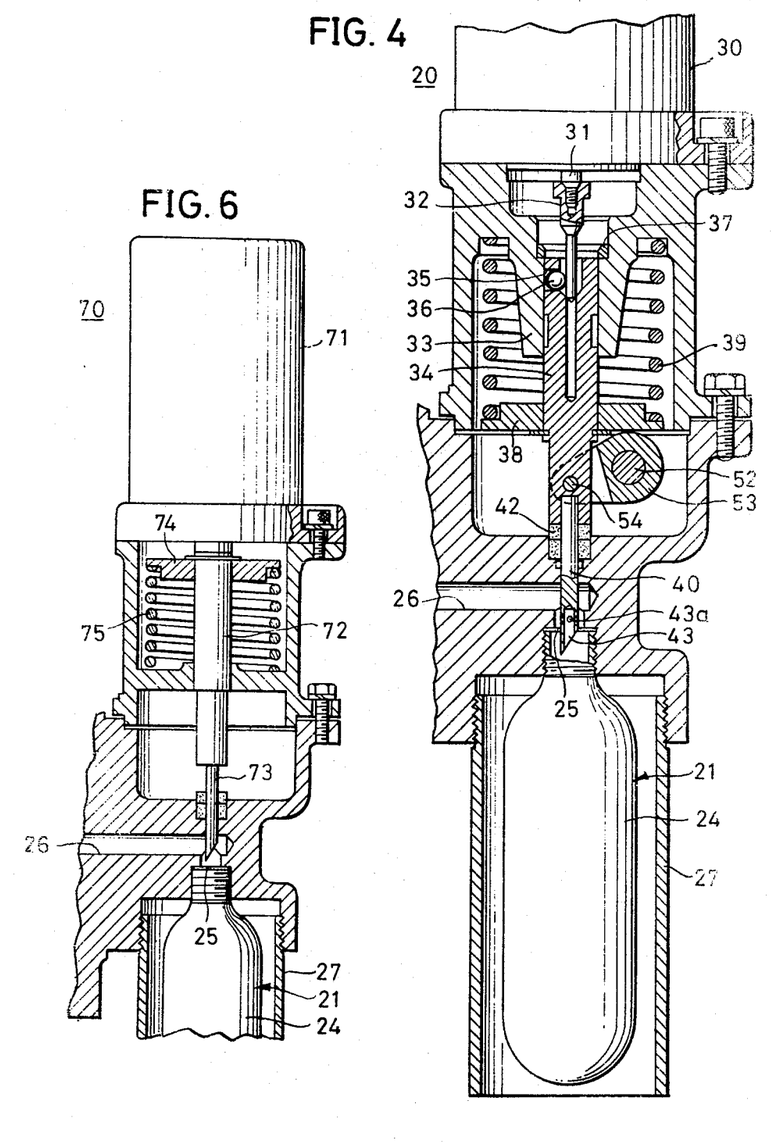
FIG. 4 is a relatively enlarged longitudinal section showing an actuator driving mechanism in the actuator shown in FIG. 2 in the state wherein the actuator has operated.
FIG. 6 is an elevation, partly in section and with a part cut away, showing an actuator driving mechanism of a third embodiment of an actuator for emergency operation of the present invention.

When the needle 32 moves upward, the ball 36 is released from its contact against the side surface of the large diameter part of the needle 32 and thereby enters into the through-hole 35 as indicated in FIG. 4. Consequently, the locked state between the ball 36 and the ball retainer 37 is terminated, and the rod 34 and the cutter 40 immediately undergo an instantaneous descending movement at a high speed under the expansion force of the coiled spring 39. The rod 34 displaces to the lower limit position where the lower end thereof abuts against a stop member 42. At this instant, the cutter 40 pierces and breaks through the rupture disc 25 and thereby unseals or opens the cylinder 21.

When the cutter 40 pierces the rupture disc 25, the interior of the cylinder 21 and the passage 26 are communicatively connected by way of a hollow part 43 and a plurality number of through-holes 43a both formed at the lower end of the cutter 40. The high-pressure gas in the cylinder 21 is then supplied, by way of the hollow part 43, the through-holes 43a, and the passage 26, to the cylinder chamber 44 of the cylinder 17. The piston 18 receives the pressure of the high-pressure gas and is displaced at a high speed towards the left as viewed in FIG. 2, reaching the sliding limit position where it comes into pressing contact with stoppers 45 as indicated by two-dot chain line in the same figure. As a result of this sliding movement of the piston 18, the rotary arm 41 is caused to revolve in the counterclockwise direction by way of a connecting rod 46, whereby the emergency shut-off valve 12 is closed through a valve stem 47. As a consequence, the supply pipe 11 is shut off by the valve 12 to terminate the supply of the fluid, whereby a serious accident induced by the above mentioned emergency condition is positively prevented.

At the outlet side of the passage 26, there is provided a throttling resistance orifice 48 for regulating the rate of inflow of the high-pressure gas into the cylinder chamber 44. By selecting the throttling resistance value of this orifice 48 at an appropriate value, it becomes possible to set suitably the sliding velocity of the piston 18, i.e., the time required to close the valve 12 depending upon factors such as the place in the supply pipeline where the valve is installed and the type of fluid conducted through the pipeline.

The high-pressure gas supplied into the cylinder chamber 44 from the gas cylinder 21 flows through a throttling resistance orifice 49 and a through-hole 50 formed in the piston 18 into an exhaust chamber 55 at the left side of the piston and is then discharged into the atmosphere through an exhaust opening 51 formed in the cylinder 17. Accordingly, when a specific time elapses after the piston 18 slides towards the left, the pressure in the cylinder chamber 44 becomes equal to the atmospheric pressure. For this reason, it becomes possible to prevent, at the time of gas cylinder replacement operation described hereinafter, accidents affecting the human body caused by the high-pressure gas expelled from the point where the gas cylinder is attached. Accordingly, the gas cylinder replacement operation can be carried out safely.

The discharge of the high-pressure gas in the cylinder chamber 44 to the atmosphere through the through-hole 50, the chamber 55, and the opening 51 is initiated immediately after the high-pressure gas starts to flow into the cylinder chamber 44. Here, since the resistance value of the throttling resistance orifice 49 is determined at a value higher than the resistance value of the throttling resistance orifice 48, the flow rate of the gas into the cylinder chamber 44 becomes higher than the discharge rate of the gas therefrom. The pressure in the cylinder chamber 44 therefore increases as the gas flows thereinto, and the piston 18 slides normally.

After a proper countermeasure for coping with the emergency situation has been taken, the valve 12 is opened again, and the actuator 10 is reset to the state in which it will be operable when the subsequent emergency state arises. When this resetting operation is carried out, the pressure in the cylinder chamber 44 has already decreased to the atmospheric pressure, whereby no special preliminary manipulation is required. When the valve stem 47 (FIG. 1) of the valve 12 is forced to rotate with a tool such as a wrench, the valve 12 operates to open and the piston 18 slides to the original position. Next, a rotary shaft 52, one end of which extends outside of the actuator driving mechanism 20, is forced to rotate with a tool such as a wrench against the force of the coiled spring 39 in the clockwise direction in FIG. 4. Accordingly, a rotatable arm 53 is rotated unitarily with the shaft 52, and the slidable rod 34 which is connected to the rotatable arm 53 by a pin 54 is then restored to the upper limit position.

On one hand, the plunger-solenoid 30 is already in a deenergized state, whereby the plunger 31 and the needle 32 are positioned at their lower positions. Accordingly, the ball 36 in the through-hole 35 is guided by a tapered part and the side-surface of the large diameter part of the needle 32 thereby to project outside of the through-hole 35 and engages with the ball retainer 37. As a result, the rod 34 is locked again as indicated in FIG. 2.

Next, the protector 27 is removed, and then the used cylinder 21 is replaced by an unused high-pressure gas charged cylinder. At this state of procedure, since the pressure in the cylinder chamber 44 and the passage 26 is already restored to the atmospheric pressure as described hereinbefore, the cylinder replacing procedure can be carried out safely without any accidents such as reverse expelling of the high-pressure gas.

Figure 5:
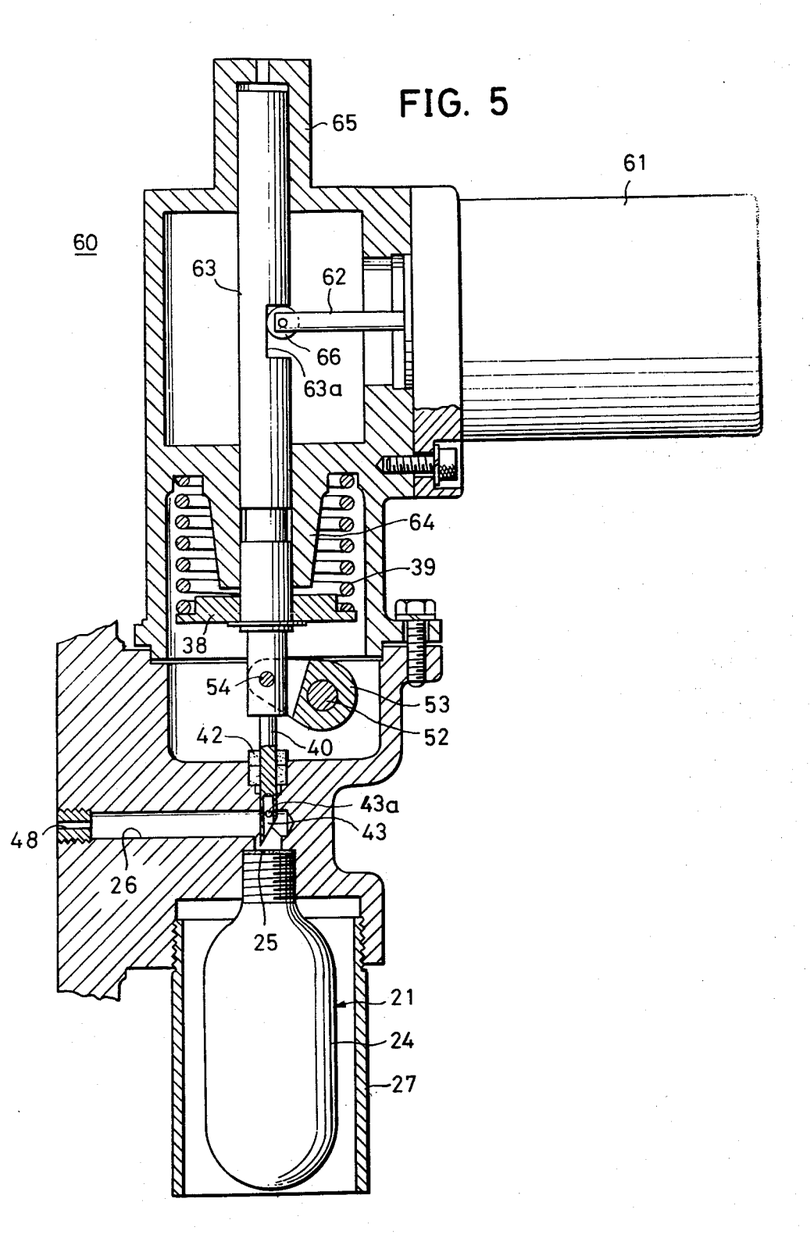
FIG. 5 is an elevation, partly in section, showing an actuator for emergency operation according to the present invention.

A second embodiment of the actuator for emergency operation according to the invention will now be described in conjunction with FIG. 5. In FIG. 5, the parts corresponding to the parts shown in FIG. 2 through FIG. 4 are designated by the like reference numerals. Detailed description of such parts is omitted.

In an actuator driving mechanism 60, a plunger-solenoid 61 is disposed with a plunger rod 62 thereof extending in a horizontal direction. The actuator is therefore of a construction with minimum dimension in the vertical direction and is therefore useful in the case where the space for installation is restricted in the vertical direction.

A slide rod 63 which is held slidably by guides 64 and 65 is engaged at a recessed part 63a thereof by a roller 66 rotatably mounted on the outer end of the plunger rod 62 and is thereby locked at its upper limit position.

When the above mentioned emergency situation occurs, the plunger-solenoid 61 is energized to cause the rod 62 to move toward the right as viewed in the same figure, similarly as in the preceding case. The slide rod 63 is therefore released from its locked state by the roller 66 and moves downward under the expansion force of the coiled spring 39. The cutter 40 fixed to the rod 63 at the lower end thereof pierces through the rupture disc 25 and thereby unseals the cylinder 21. As a result, the actuator mechanism 19, illustrated in FIG. 2, is driven by the high-pressure gas in the cylinder 21, in the same manner as in the preceding embodiment, and then, the emergency shut-off valve 12 is closed.

After the emergency state has ended, the rotary arm 53 is rotated. The rod 63 is therefore displaced upward to the position prior to operation and is again locked or held at the upper limit position.

According to this second embodiment of the invention, the locking mechanism can be made with simpler structure and lower cost in comparison with the above described first embodiment.

In the both embodiments of the invention described hereinabove, the plunger-solenoid is employed as means for releasing the sliding rods 34 and 63 from their locked state. The lock releasing means, however, is not limited to this plunger-solenoid. A small-sized motor driven by a battery or a rack and pinion mechanism driven by a selsyn motor which is operated by radio wave transmitted from outside may also be used.

A third embodiment of the actuator for emergency operation according to the present invention will now be described in conjunction with FIG. 6. In this figure, the parts corresponding to those in FIG. 2 through FIG. 4 are designated by the like reference numerals. Detailed description thereof is omitted.

In an actuator driving mechanism 70 in FIG. 6, a plunger-solenoid 71 is accommodated within a casing of pressure-proof and explosion-proof structure, and a cutter 73 is fixed to the lower end of a plunger rod 72 of the solenoid 71. When the plunger-solenoid 71 is in a deenergized state, the plunger rod 72 is held displaced upward by the expansion force of a coiled spring 75 interposed between a spring retainer 74 and a supporting member. The cutter 73 is thus positioned to confront the rupture disc 25 of the high-pressure gas cylinder 21.

When an emergency situation such as an earthquake or a fire occurs, the plunger-solenoid 71 is energized for a short period by an electric current. The plunger rod 72 is thereby forced to descend counter to the force of the coiled spring 75, and the cutter 73 pierces the rupture disc 25. As a result, the high-pressure gas within the cylinder 21 is expelled therefrom and is supplied through the passage 26 into the actuator cylinder. Consequently, the actuator mechanism 19 is driven in the same manner as in the preceding cases, and the valve 12 is closed. When the plunger solenoid 71 is deenergized, the rod 71 is raised by the force of the spring 75.

In the instant embodiment of the invention, a rack and pinion mechanism driven by a motor can be used in place of the plunger solenoid 71. Further, the instant embodiment may be modified so that, by providing a manipulation lever in place of the plunger solenoid 71, an operator, in a service station can manipulate the lever in response to instruction transmitted by radio from a main office. Further, according to the instant embodiment, it is not necessary to provide a locking mechanism, whereby the construction thereof is simplified.

Since the instant embodiment of the invention is constructed so that the rupture disc 25 is broken by the operational force of the plunger solenoid 71 itself, it is necessary to supply the solenoid 71 with electric current of a magnitude which is greater than that in each of the preceding embodiments. For this reason, it is desirable, from the standpoint of safety, including explosion-proofness, to adapt the actuator of the instant embodiment to emergency shut-off valves installed in pipelines for conducting non-dangerous fluids.

Figure 7:
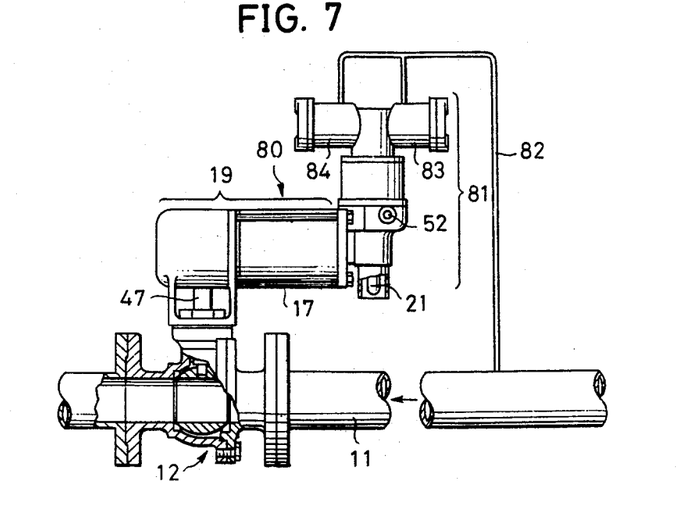
FIG. 7 is an elevation showing another example of an emergency shut-off valve system to which a fourth embodiment of an actuator for emergency operation according to the present invention is applied.
Figure 8:
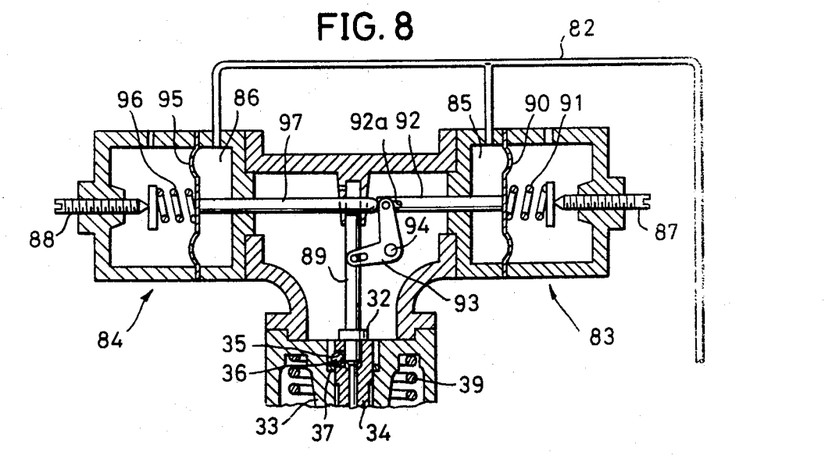
FIG. 8 is an elevation, in vertical section, showing an essential part of the actuator shown in FIG. 7.

Next, a fourth embodiment of the actuator for emergency operation according to the present invention will now be described with reference to FIG. 7 and FIG. 8. In FIGS. 7 and 8, the parts corresponding to the parts in FIGS. 1 and 2 are designated by the like reference numerals. Detailed description of these parts is not repeated.

An actuator 80 is constructed in such a manner that, by the pressure derived from the supply pipe 11, the locking mechanism of the actuator driving mechanism 81 is released at the time when an emergency state arises. The pressure of such as city gas in the supply pipe 11 is introduced, by way of a branch pipe 82 communicatively connected to the pipe 11 at a position upstream with respect to the emergency shut-off valve 12, into diaphragm chambers 85 and 86 in abnormal pressure-rise and pressure-drop detection and operation mechanisms 83 and 84, respectively. The abnormal pressure rise detection and operation mechanism 83 operates in response to any rise of the pressure within the supply pipe 11 above a predetermined upper limit value. The abnormal pressure drop detection and operation mechanism 84 operates in response to any drop in the pressure within the supply pipe 11 below a predetermined lower limit value. These upper and lower limit values are suitably preset by adjusting screws 87 and 88, respectively.

When the gas pressure within the pipeline 11 is within a specific normal range, the pressure detection and operation mechanisms 83 and 84 are in a state of equilibrium as shown in FIG. 8, and a vertical rod 89 and the needle 32 fixed to the lower end thereof are at their lowered positions. The sliding rod 34 is locked in its upper limit position by the ball 36 similarly as in the cases described hereinbefore.

When an abnormal situation arises, and the pressure within the supply pipe 11 increases abnormally, this pressure is transmitted through the branch pipe 82 to a chamber on the inner side of a diaphragm 90 in the pressure detection and operation mechanism 83. The diaphragm 90 is thereby displaced outward, or to the right as viewed in FIG. 8, against the force of a coil spring 91 interposed between the diaphragm 90 and a spring retainer pressed against the inner tip of the adjusting screw 87. Consequently, a horizontal rod 92 fixed at its right-hand end to the diaphragm 90 is displaced toward the right.

This rightward displacement of the rod 92 causes a bell-crank lever 93 coupled at the outer end of one of its arms to the rod 92 to rotate clockwise about a pivot pin 94. The vertical rod 89, which is coupled to the outer end of the other arm of the bell crank lever 93, and the needle 32 are thereby raised. As a consequence, the rod 34 is released from its locked state due to the ball 36 and the ball retainer 37, whereupon the gas cylinder 21 is opened similarly as in the case of the above described first embodiment of the invention. Thus, the actuator 80 is operated by the high pressure gas in the gas cylinder 21 to close the valve 12.

In the case where, conversely, the pressure within the pipeline 11 drops abnormally, a diaphragm 95 in the abnormal pressure drop detection and operation mechanism 84 is displaced toward the right as viewed in FIG. 8 by the force of a coil spring 96. Consequently, a horizontal rod 97 fixed at its outer end to the diaphragm 95 is also displaced toward the right. At this time, the bell-crank lever 93 is engaged at the end of its arm coupled to the rod 92 by the rod 97 and thereby rotated clockwise. Thus, the actuator 10 is operated to close the valve 12 in the same manner as in the case of abnormally high pressure in the supply pipe 11. In this case, the ball-crank lever 93 is rotated clockwise, but its rotation is not obstructed by the rod 92 because of a slot 92a formed longitudinally therein.

In this fourth embodiment of the invention, the actuator may be provided with only either one of the abnormal pressure rise detection and operation mechanism 83 and the abnormal pressure drop detection and operation mechanism 84.

Furthermore, while the actuator is applied to an emergency shut-off valve in each of the above described embodiments of the invention, the actuator of the invention is not thus limited in application, it being possible to apply this emergency actuator to devices such as, for example, the emergency door opening device of a steel shutter installed at emergency exits of buildings and emergency water-supply devices of nuclear furnaces.

Further, this invention is not limited to these embodiments but various variations and modifications may be made without departing from the scope and spirit of the invention as set forth in the following claims.

What is claimed is:

1. An apparatus for operating a driven device in an emergency, comprising:

an actuator mechanism having a cylinder, a piston slidably disposed within said cylinder and coupled to said driven device, an operational chamber formed by said cylinder and piston, and passage means communicating with said operational chamber;

a high pressure gas generating source defined by a container vessel having an opening, a high pressure gas generating medium contained within said vessel, and a sealing member for sealing said opening of said vessel; and means for unsealing said sealing member of said high pressure gas generating source in response to an emergency signal from outside of said seal, said unsealing means having a cutter with a sharp tip, spring means cooperating with said sharp tip for applying a force to urge said cutter in to pierce and rupture said sealing member, locking means for locking said cutter against said spring means for holding the cutter in a designated position, having said sharp tip directed toward and held apart from said sealing member, and unlocking means responsive to said emergency operation signal for unlocking said locking means and urging said spring means to advance said cutter causing rupture of said sealing member and thereby permitting a flow of high pressure gas from said high-pressure gas generating medium through said opening for passage into said operational chamber and thereby causing said piston thereby to drive said driven device.

2. An apparatus as claimed in claim 1 wherein: said unlocking means is formed by a plunger type solenoid operable over a short time interval for unlocking said locking means in response to electric power provided by said emergency operation signal.

3. An actuator as claimed in claim 1, wherein: said cylinder interior is divided by said piston to form an operational chamber on one side of said piston and an exhaust chamber on the opposite side of the piston; said piston further being provided with a small diameter hole formed therethrough for communication with said operational chamber and said exhaust chamber; and said cylinder being provided with an opening for communicating with said exhaust chamber and atmosphere outside of the cylinder, and further comprising means for setting a flow rate of high pressure gas flowing through said communicating passage into said operational chamber in terms of flow quantity per unit time.

4. An apparatus as claimed in claim 1, wherein: said locking means immobilizes said cutter from movement in a direction toward said sealing member; and said unlocking means being adapted to move said cutter in a reverse direction for unlocking the locking member.

5. An apparatus as claimed in claim 1 wherein: moving means are provided for moving the cutter back to an original position by overcoming an opposing force formed by said spring means to thereby lock said cutter by said locking means.

* * * * *